Sept. 9, 1969 R. S. LUNDIN ET AL 3,466,457

ELECTRONIC SWITCHING FOR COUNTERS

Filed May 10, 1965 3 Sheets-Sheet 1

INVENTORS.
Robert S. Lundin
Edward T. Bosman
Louis Altman
ATTORNEY.

INVENTORS.
Robert S. Lundin
Edward T. Bosman
Louis Altman
ATTORNEY.

Sept. 9, 1969 R. S. LUNDIN ET AL 3,466,457

ELECTRONIC SWITCHING FOR COUNTERS

Filed May 10, 1965 3 Sheets-Sheet 3

INVENTORS.
Robert S. Lundin
BY Edward T. Bosman
Louis Altman
ATTORNEY.

United States Patent Office 3,466,457
Patented Sept. 9, 1969

3,466,457
ELECTRONIC SWITCHING FOR COUNTERS

Robert S. Lundin, Thomaston, and Edward T. Bosman, Watertown, Conn., assignors to General Time Corporation, New York, N.Y., a corporation of Delaware Filed May 10, 1965, Ser. No. 454,590
Int. Cl. H01f 27/42
U.S. Cl. 307—88 9 Claims

ABSTRACT OF THE DISCLOSURE

An electronic switching circuit is disclosed that employs a variable magnetic counter that functions to count uniform volt-second input pulses from a pulse source having a fixed supply voltage and a selectably adjustable supply voltage which is held in constant ratio with the fixed voltage. Manual selection of desired counts is established by setting selector switches. When a preselected number of pulses are accrued, a command pulse is delivered to perform a function.

This invention relates to electronic switching for counters. More specifically it relates to electronic switching for selectively connecting in cascade two or more incremental magnetic counters. The invention disclosed herein is specifically applicable to electronic counters disclosed in the copending applications of Robert S. Lundin, namely Voltage Controlled Adjustable Counters, Ser. No. 363,361 filed Apr. 29, 1964, now Patent Number 3,376,410 and Reversed Counting Logic filed concurrently herewith and to the Multistage Counter disclosed in the copending application of George J. Yagusic entitled Counter Logic also filed concurrently herewith. These applications are all assigned to the assignee of the present application, and their disclosures are specifically incorporated herein by reference.

There are a wide variety of control applications where an inexpensive, mass-produced counting device of small size and light weight could be employed to count to a present number within a count range. Neitzert, U.S. Patent No. 2,897,380, assigned to the same assignee as the present invention, describes a type of incremental magnetic counter to which the present invention is readily applicable. The magnetic core of such a counter is driven from one condition of magnetic saturation to its opposite condition of magnetic saturation in increments corresponding in number to a predetermined number of electrical pulses applied to an input winding about the core. The final pulse magnetically saturates the core. The core then drops back to a residual level. The change in magnetic flux induces a reset signal. In response thereto, the core is returned to its original condition of magnetic saturation. This change in flux produces an output pulse in an output winding about the core.

Each output pulse is of uniform volt-second content and may be used to effect a suitable control function or may be applied to additional magnetic counters. To increase the count capabilities of the device the magnetic counters are selectively cascaded, i.e., connected in interative serial order.

The principal disadvantage of the magnetic counters disclosed in the afore-mentioned Neitzert patent is that they cannot be conveniently adjusted to different count moduli. The count modulus of a magnetic counter is the number of input pulses of constant volt-second content required to drive the magnetic core from one condition of magnetic saturation to its opposite condition of magnetic saturation. It will be appreciated that convenient adjustability of the count modulus provides versatility.

That is, it is extremely desirable that the counters have the capability to be conveniently adjusted to count to any preset count total within a given range, and thus not have to be specifically factory designed to count to a particular fixed count total. Counters having a convenient adjustability feature can thus be readily mass-produced.

In the above-identified copending applications of Robert S. Lundin and George J. Yagusic there are disclosed and claimed variable magnetic counters which may be adjustably set to count to any preset count within a given count range. This is accomplished by providing an adjustable voltage to each variable magnetic counter which is used to supplement the volt-second content of the electrical pulses applied to its input winding. Thus, this adjustable voltage may be set at various levels so as to vary the number of input pulses required to switch the core from one condition of magnetic saturation to its opposite condition of magnetic saturation. If the level of this adjustable voltage is increased, fewer input pulses are required; and vice versa.

As described in these copending applications, a plurality of fixed and variable magnetic counters are selectively cascaded together in order to increase the count range in which the system may operate. During the counting operation of these systems, individual variable counters must be selectively connected to prior fixed counters or a pulse former in counting to a preset high-count total.

The control circuitry for achieving this, disclosed in copending application Ser. No. 363,361, has several disadvantages. Among these is that the adjustable voltage is selectively applied to the interstage electronic valve means through electronic gate means in order to operatively interconnect two count stages. To operatively disconnect two count stages the electronic gate is operated to inhibit the application of the adjustable voltage to the interstage electronic valve. In order to vary the count total this adjustable voltage is preset to any one of a wide range of potentials. Thus, the interstage electronic valve is controlled by a potential whose level varies over a wide range when it is to operatively interconnect two count stages. This puts rather stringent requirements on the nature of this electronic valve means.

Since the electronic gate is operated to selectively apply the adjustable potential to the interstage electronic valve, it must have power handling capabilities. This puts rather stringent requirements on the electronic gate.

Furthermore, according to the prior disclosures, the total volt-second increments applied to a succeeding counter thus defining the number of counts to which that counter will count is an additive function of the volt-second output of the preceding counter plus the variable voltage applied in the input circuit of the succeeding counter times the output pulse length of the preceding counter. This requires that the output coil of each counter to which a succeeding stage is to be connected be carefully tested and adjusted such that the precise volt-second output required is attained.

It is therefore an object of the present invention to provide electronic circuit means for interconnecting electronic counter stages.

It is another object of the invention to provide means of the above character for selectively interconnecting electronic counter stages.

It is a further object of the invention to provide means of the above character for interconnecting incremental magnetic counters.

A still further object of the invention is to provide isolation between the input, output and reset circuits of an incremental magnetic counter.

Another object of the invention is to provide means of the above character for adjustable count magnetic counter.

Still another object of the invention is to provide means of the above character making the count of interconnected counters insensitive to variations in supply potential.

A further object of the invention is to provide a power supply for electronic counter and electronic circuit means of the above character.

Another object is to provide a variable magnetic count stage employing means of the above character.

A still further object of the invention is to provide means of the above character that is inexpensive, efficient and compact.

Other objects of the invention will in part be obvious and will in part appear hereinafter.

The invention accordingly comprises the features of construction, combinations of elements and arrangements of parts which will be exemplified in the constructions hereinafter set forth and the scope of the invention will be indicated in the claims.

For a fuller understanding of the nature and objects of the invention, reference should be had to the following detailed description taken in connection with the accompanying drawings in which.

Broadly stated, the present invention relates to electronic switching circuitry used in a variable magnetic counter stage operating to count uniform volt-second input pulses developed by a pulse source. A power supply provides a fixed supply voltage for the pulse source. The power supply provides a selectably adjustable voltage which is held in constant ratio with the fixed voltage. An input winding linking a saturable magnetic core is connectable to receive the adjustable voltage from the power supply. First electronic valve means operates in response to each input pulse to pass current through the input winding in proportion to the adjustably preset potential level of the adjustable voltage developed by the power supply to determine the count modulus of the variable counter. Second electronic valve means controlled by an electronic latch selectively applies a bias signal to the first electronic valve means. This bias signal is effective to enable the first electronic valve means to respond to the input pulses from the pulse source. Thus, the enabling and the disabling of the first electronic valve means is under the control of the bias signal developed by the conjunctive operation of the electronic latch and the second electronic valve means.

In one disclosed embodiment of the invention, the input pulses of constant volt-second content from the pulse source are injected into the input winding through the first electronic valve means. Thus, the preset adjustable voltage level is additively applied to the input winding along with the input pulses to determine the count modulus of the count stage.

In a second disclosed embodiment of the invention, the input pulses from the pulse source are used to gate the application of the adjustable voltage to the input winding. Thus, in this embodiment of the invention, the volt-second input to the input winding is proportional to the preset potential level of the adjustable voltage multiplied by the time duration (second content) of each input pulse.

Figure 1:
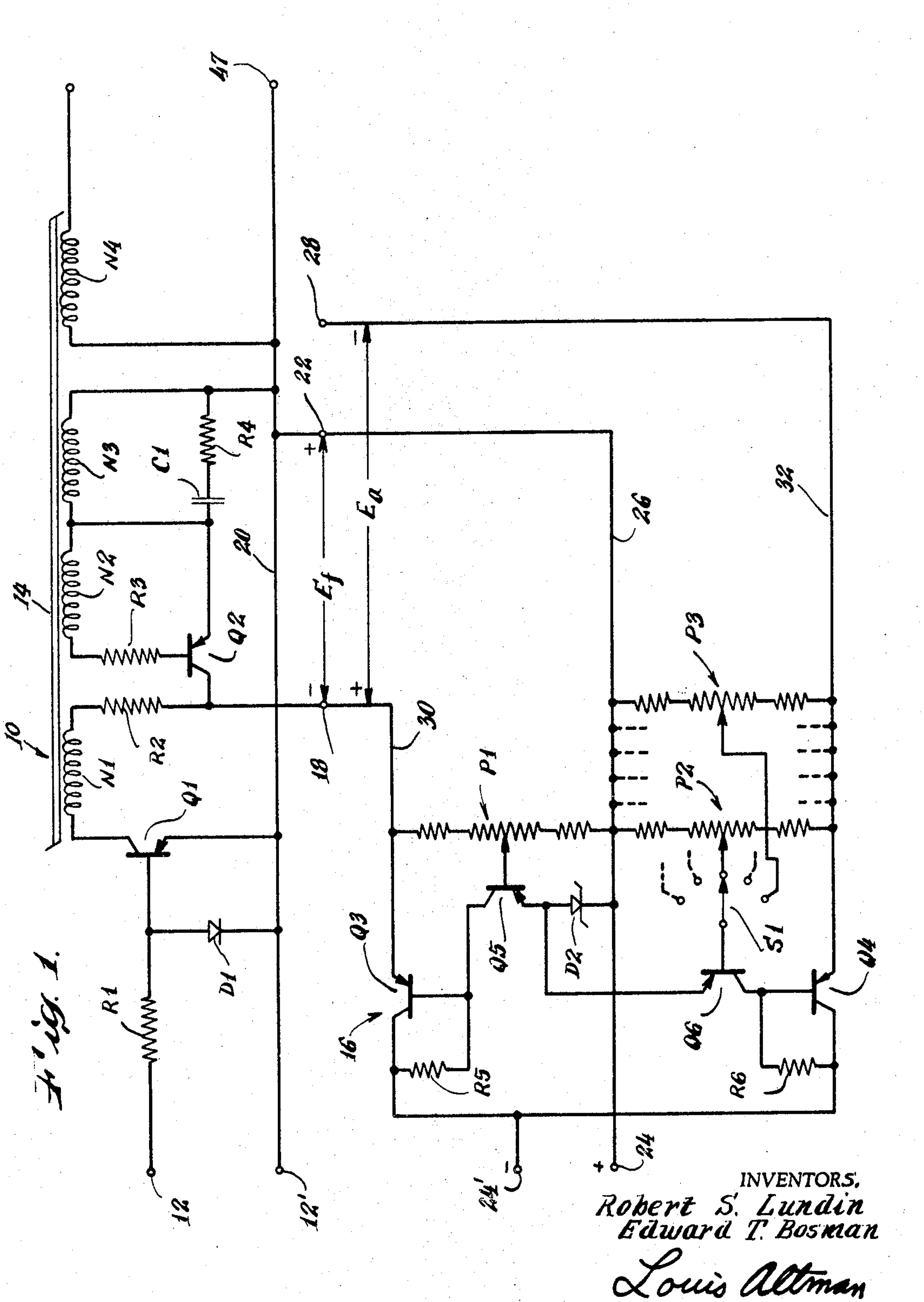
FIGURE 1 is a circuit diagram of a pulse former and a power supply preferably employed with the present invention.

Referring now to the drawings, and particularly to FIGURE 1, a pulse former, generally indicated at 10, receives input pulses applied across input terminals 12 and 12'. These input pulses to be counted are derived from any suitable pulse source (not shown) and may be in the form of poorly shaped spikes. As more fully explained in the above noted Neitzert Patent No. 2,897,380 and also in the above noted copending application Ser. No. 363,361, these input pulses are applied through a limiting resistor R1 to the base and emitter of an input transistor Q1. A diode D1 is connected between the base and emitter of transistor Q1 such that only pulses driving the base negative relative to the emitter reach the input transistor. One side of an input winding N1 linking a saturable magnetic core 14 is connected to the collector of the input transistor Q1. The other side of the input winding N1 is connected through a limiting resistor R2 to a terminal 18 of a power supply, generally indicated at 16. A buss 20, to which input terminal 12', the cathode of diode D1, and the emitter of input transistor Q1 are connected, is in turn, connected to a power supply terminal 22. The power supply 16 supplies a fixed voltage $E_f$ across terminals 18 and 22, with terminal 18 negative relative to terminal 22. Each input pulse applied to terminals 12, 12' turns on the input transistor Q1 permitting core-saturating current to be drawn from the power supply 16 through the input winding N1 linking the core 14. Since, in the illustrated embodiment of FIGURE 1, the unit 10 is assumed to be a pulse former, this current surge through the input winding N1 is sufficient to drive the core 14 from one condition of magnetic saturation beyond its opposite condition of magnetic saturation.

Upon termination of each input pulse, the current surge through input winding N1 also terminates, and the core returns to a residual level of magnetic saturation. This flux change induces a voltage in a triggering winding N2 linking the core 14. One side of the triggering winding N2 is connected through a resistor R3 to the base of a resetting transistor Q2 while its other side is connected directly to the emitter of this transistor. The polarity of this induced voltage in winding N2 is such as to turn on the resetting transistor Q2. As a consequence, resetting current is drawn from the power supply 16 through the collector-emitter circuit of resetting transistor Q2 and reset winding N3 linking the core 14. This current flow through reset winding N3 is in a direction to reset the core 14 to its original condition of magnetic saturation. The resulting change in flux causes a voltage to be induced in an output winding N4, also linking the core 14. Since the unit 10 is operating as a pulse former, a voltage pulse is induced in output winding N4 for each input pulse applied to input terminals 12, 12'. As fully explained in the Neitzert patent and copending application Ser. No. 363,361, each voltage pulse developed in the output winding N4 is of constant volt-second content. This characteristic of the output pulse is preserved in spite of variations in the fixed voltage $E_f$ developed by the power supply 16.

The power supply 16 is more fully described in copending application Ser. No. 363,361. The power supply 16 develops the fixed voltage $E_f$ and also an adjustable $E_a$. The adjustable voltage $E_a$ is advantageously used to adjustably preset the count modulus in variable incremental magnetic counters as disclosed and claimed in this copending application. The count modulus of a variable incremental magnetic counter is the number of input pulses required to incrementally drive the core of the counter from one condition of magnetic saturation to its opposite condition of magnetic saturation. The pulse former 10, being a fixed magnetic counter with a count modulus of 1, is not provided with the adjustable voltage $E_a$.

Still referring to FIGURE 1, to briefly review the construction of the power supply 16, an unregulated D.C. supply is connected across input terminals 24, 24'. The polarity of this unregulated D.C. supply is such that terminal 24 is positive relative to terminal 24'. Input terminal 24 is connected over a buss 26 to power supply output terminal 22. The negative input terminal 24' is connected to a pair of series regulating transistors Q3 and Q4. Regulating transistor Q3 is controlled so as to develop the fixed supply voltage $E_f$ across terminals 18, 22 while regulating transistor Q4 is controlled so as to develop a selected variable voltage $E_a$ appearing across output terminal 18 and output terminal 28.

The control of regulating transistor Q3 is provided by a sensing and amplifying transistor Q5. The emitter of transistor Q5 is clamped at a reference potential level by a Zener diode D2 connected to the buss 26. The base of transistor Q5 receives a potential developed by a potential divider, generally indicated at P1, connected between the buss 26 and a buss 30 connecting the emitter of the regulating transistor Q3 to the power supply output terminal 18. As the voltage across these two busses 26 and 30 varies, this variation is sensed by transistor Q5 and an amplified error signal is supplied to regulating transistor Q3 to correct for the voltage variation.

The adjustable supply voltage $E_a$ developed across output terminals 18 and 28 is derived in a similar manner. The emitter of series regulating transistor Q4 is connected to the power supply output terminal 28 over a buss 32. A sensing and amplifying transistor Q6 controls the conductance of regulating transistor Q4. The emitter of transistor Q6 is clamped to the same reference potential as the emitter of transistor Q5 by Zener diode D2. The base of sensing and amplifying transistor Q6 is selectively connected through a count selector switch S1 to receive potentials developed by any one of a plurality of potential dividers, of which two are specifically shown at P2 and P3. Thus, in order to derive the selected level of adjustable supply voltage $E_a$ the selector switch S1 is manipulated to tap an appropriate potential developed by one of the potential dividers P2, P3, etc.

As more fully explained in copending application Ser. No. 363,361, regardless of what level of adjustable voltage $E_a$ is selected, it tracks the voltage level of the fixed voltage $E_f$ by virtue of the fact that both sensing and amplifying transistors Q5 and Q6 are clamped to the same reference potential by Zener diode D2. Thus, the ratio of the fixed supply voltage $E_f$ and the adjustable supply voltage $E_a$ is maintained constant.

Figure 2:
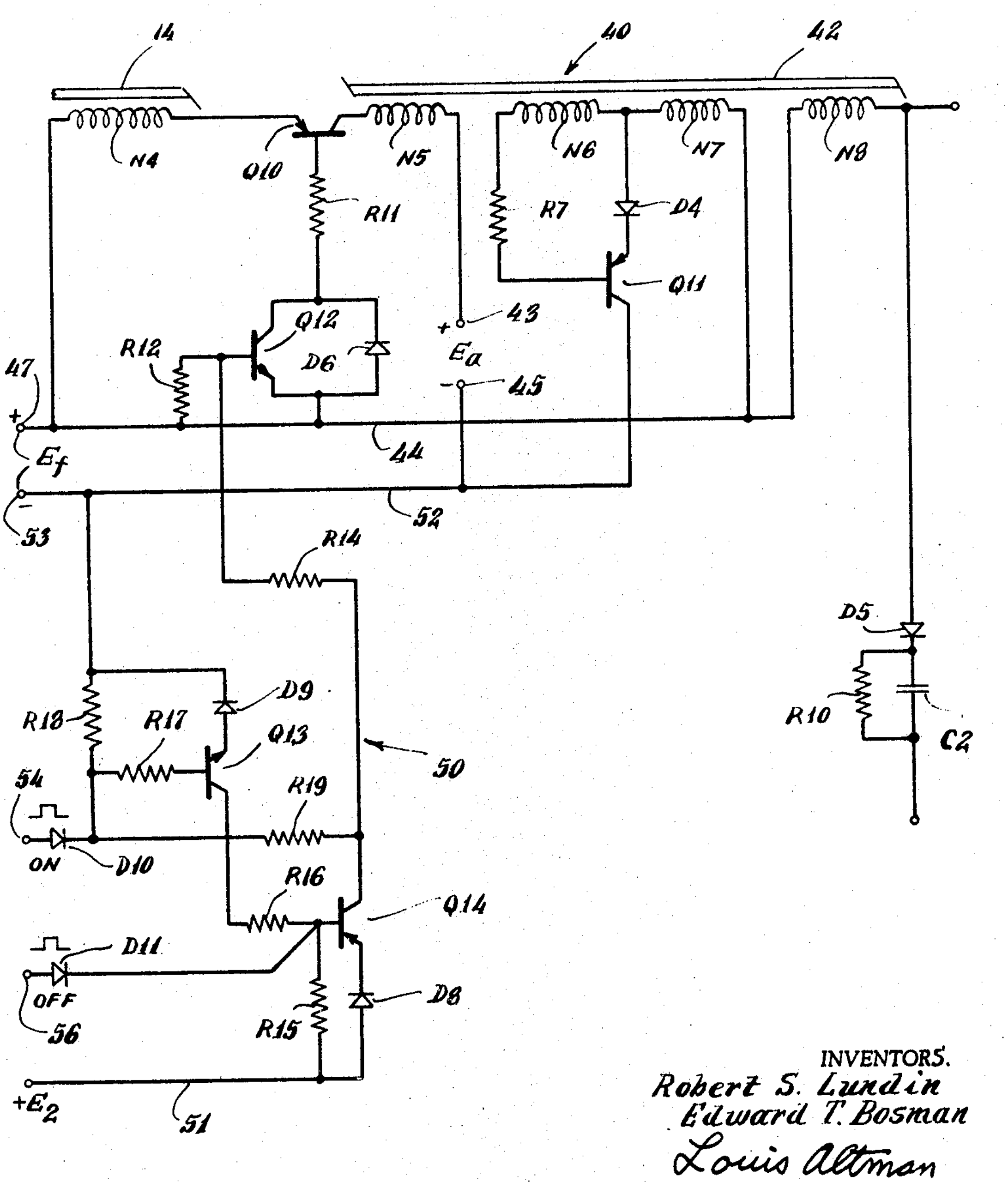
FIGURE 2 is a circuit diagram of an incremental magnetic counter stage and the electronic switching means of the present invention.

Referring now to FIGURE 2, a variable incremental magnetic counter, generally indicated at 40, is constructed in a similar manner as the pulse former 10 of FIGURE 1 in that it includes an input winding N5, a triggering winding N6, a resetting winding N7, and an output winding N8 all linking a saturable magnetic core 42. It will be noted that in this same respect the incremental variable magnetic counter 40 corresponds to the variable counters disclosed in the above-noted copending applications. One side of the output winding N4 of the pulse former 10 of FIGURE 1 is connected to the emitter of an interstage transistor Q10. It will be appreciated that this output winding N4 will in some cases be that of a fixed count incremental magnetic counter as disclosed in application Ser. No. 363,361 and also as disclosed in the applications of Robert S. Lundin for Reverse Counting Logic and of George J. Yagusic for Reverse Counting Logic Systems, both applications filed concurrently herewith.

One side of the input winding N5 of the variable counter 40 is connected to the collector of the interstage transistor Q10 while its other side is connected to a terminal 43 to which is applied the positive side of the adjustable voltage $E_a$ developed by the power supply 16 of FIGURE 1. The negative side of the adjustable voltage $E_a$ at terminal 45 is connected to a buss 52 to which is applied the negative side of the fixed supply voltage $E_f$ at terminal 53. The positive side of the fixed supply voltage $E_f$ is applied to terminal 47 connected to buss 44.

As in the case of pulse former 10 of FIGURE 1 triggering winding N6 turns on a resetting transistor Q11 when the core 40, incrementally driven beyond its opposite condition of magnetic saturation, returns to its residual saturation condition. Once transistor Q11 is triggered on, the resetting winding N7 draws resetting current driving the core 42 to its original condition of magnetic saturation. As a consequence, an output pulse is induced in the output windings N8. This pulse is applied through a diode D5, and the parallel combination of a resistor R10 and a capacitor C2 as an output pulse to perform the various functions in a multi-stage magnetic counter as disclosed in the above-noted copending applications.

The significant and novel differences between the variable magnetic count stage disclosed in copending application Ser. No. 363,361 and the variable count stage disclosed in FIGURE 2 herein is the manner in which the adjustable voltage $E_a$ is applied to the counter. The interstage transistor Q10 is selectively controlled in a novel manner so as to either effectively enable or inhibit the magnetic counter 40.

To this end, the base of interstage transistor Q10 is connected through a resistor R11 and the collector-emitter circuit of a switching transistor Q12 to buss 44. A diode D6 is connected in shunt with the collector-emitter circuit of the switching transistor Q12. The base of transistor Q12 is connected through a resistor R12 to the buss 44.

An electronic latch generally indicated at 50 is provided to control the operation of switching transistor Q12. This electronic latch 50 is substantially the same as the electronic latch disclosed in the application of Klaus Walentowitz for Electronic Timer Circuit Ser. No. 405,503, filed Oct. 21, 1964. The electronic switch 50 comprises a pair of transistors Q13 and Q14. The collector of transistor Q14 is connected through a resistor R14 to the base of switching transistor Q12. The emitter of transistor Q14 is connected through a diode D8 to a buss 51 to which a positive voltage $E_2$ is applied from a suitable power source (not shown). The base of transistor Q14 is connected through a resistor R15 to buss 51. In addition, the base of transistor Q14 is connected through a resistor R16 to the collector of transistor Q13. The emitter of transistor Q13 is connected through a diode D9 to buss 52. The base of transistor Q13 is connected through resistors R17 and R18 to buss 52. The collector of transistor Q14 is returned to the junction between resistors R17 and R18 through a resistor R19. An input terminal 54 receives a positive "on" triggering pulse which is passed through a diode D10 to the junction between resistor R17 and R18. A second input terminal 56 receives a positive "off" triggering pulse which is passed through a diode D11 to the base of transistor Q14.

In operation, to trigger the electronic latch 50 to its "on" condition, a positive pulse, applied to input terminal 54, passes through diode D10 and is communicated through resistor R17 to the base of transistor Q13. As a result, transistor Q13 is driven into saturation. With transistor Q13 conducting, the potential at the base of transistor Q14 falls negatively to bias transistor Q14 into saturation. With transistor Q14 now conducting, the positive potential on its collector communicated back through resistors R19 and R17 to the base of transistor Q13 serves to latch this transistor in its conductive state. With transistor Q13 latched in conduction, the base of transistor Q14 is clamped sufficiently negative relative to its emitter so that it will be also latched into conduction. It will thus be seen that even after termination of the "on" triggering pulse applied to terminal 54, the electronic latch 50 remains in its "on" condition.

To turn the electronic latch 50 off, an "off" triggering pulse is applied to input terminal 56. This pulse, passed through diode D11, cuts off transistor Q14. When transistor Q14 ceases to conduct, transistor Q13 likewise is driven off, and the electronic latch thus remains in its "off" condition until it is triggered "on." The electronic switch 50 thus operates in the manner of a flip-flop but is found to be less temperamental and requires less components than conventional flip-flop circuits.

In considering the control of the electronic latch 50 on the switching transistor Q12 in the base circuit of the interstage transistor Q10, it will be recalled that if the electronic latch is in its "off" condition, transistor Q14 is non-conducting. Consequently, the emitter and base of switching transistor Q12 are at substantially the same potential, and it will be biased off. If the electronic latch 50 is triggered "on," transistor Q14 goes into conduction. With the potential of the supply voltage $E_2$ more positive than the relatively positive voltage applied to buss 44 from the power supply 16 (FIGURE 1), the potential on the base of transistor Q12 will rise positively relative to its emitter thereby biasing this transistor on. It will be seen that with the switching transistor Q12 biased into conduction, the lower terminal of the base resistor R11 of the base transistor Q10 is tied to the positive buss 44.

The operation of the variable count stage 40 in response to output pulses induced in output winding N4 of the pulse former (or fixed counter) will now be considered. The polarity of the output pulses induced in output winding N4 is such that the emitter of interstage transistor Q10 is driven positive relative to its base. These output pulses tend to turn the interstage transistor Q10 on such that these pulses would be passed to the input winding N5 of the variable counter 40. However, if the electronic switch 50 is in its "off" condition and therefore switching transistor Q12 is nonconducting, the base of the interstage transistor Q10 is essentially floating for these output pulses; diode D6 blocks the application of these output pulses to the base of interstage transistor Q10.

When the saturable core 14 of the pulse former 10 (FIGURE 1) is being driven from its original condition of magnetic saturation to its opposite condition of magnetic saturation, a voltage is induced in output winding N4 of opposite polarity to that of the output pulses. These oppositely poled unwanted pulses are communicated to the base of interstage transistor Q10 through diode D6 to insure that this transistor is maintained off, and thus not passed to the input winding N5 of the variable counter 40.

When the electronic switch 50 is triggered to its "on" condition, the switching transistor Q12 is biased on. As a result, the output pulses developed by output winding N4 can be applied across the emitter and base of the interstage transistor Q10 to bias it on. Consequently, these output pulses are passed through the enabled interstage transistor Q10 to the input winding N5 of the variable counter 40.

As specifically described in the above-noted copending application, Ser. No. 363,361, and as seen in FIGURE 2, the adjustable voltage $E_a$ is additively connected in circuit with the input winding N5 so as to selectively alter the volt-second content of the input pulses passed by the interstage transistor Q10 to the input winding. Thus, the adjustable voltage $E_a$ can be selected to conveniently determine the number of input pulses required to completely switch the saturable core 42 of the variable counter 40. As previously noted, the number of pulses required to switch the core corresponds to the count modulus of the variable count stage.

It will thus be seen from the circuit of FIGURE 2, that the control circuitry, namely the electronic latch 50 and the switching transistor Q12, are uniquely employed to control the interstage transistor Q10 in a manner such that only the base current of the interstage transistor is handled. In the disclosure of copending application Ser. No. 363,361, the switching or gate transistor operates to selectively apply the adjustable voltage $E_a$ to the base of the interstage transistor. This requires the switching transistor to have relatively high power handling capabilities. In contradistinction however, the switching transistor Q12 of the present invention need only selectively apply base current to the interstage transistor Q10 and thus need only have signal carrying capabilities as contrasted to power handling capabilities. The variable counter 40 is thus readily and efficiently connectable under the control of the latch 50 to receive pulse outputs from previous count stages in the high-count systems disclosed in the above-noted copending applications.

As was previously noted in connection with the discussion of the power supply 16 of FIGURE 1, the adjustable voltage $E_a$ and the fixed voltage $E_f$ are maintained in constant ratio. As explained in copending application 363,361, the volt-second product of the output pulses induced in output winding N4 of pulse remains constant. If the fixed voltage $E_f$ fluctuates, the core reset time and thus the output pulse duration will fluctuate in inverse proportion. The voltage of the output pulses also fluctuates in order to maintain their volt-second content constant. Since the adjustable voltage $E_a$ tracks the fixed voltage $E_f$, the level of the adjustable voltage $E_a$ follows variations in the fixed voltage $E_f$. Consequently, the additive function of the adjustable voltage $E_a$ is fully compensated for variations in the power supply 16.

By way of example and not to limit the invention, the parameters of the various circuit elements of FIGURE 2 may be as follows.

transistors:
- Q10—2N1303
- Q12 and Q13—2N2711
- Q14—2N3638 resistors:
- R11—47 ohms
- R12, R14, R15 and R16—470 ohms
- R17—6.8 kilohms
- R18—3.9 kilohms
- R19—18 kilohms diodes:
- D8–D11—TS2 (supplied by Diodes Inc.)
- D5—1N191
- fixed voltage $E_f$—6 volts
- supply voltage $E_2$—+15 volts.

Figure 3:
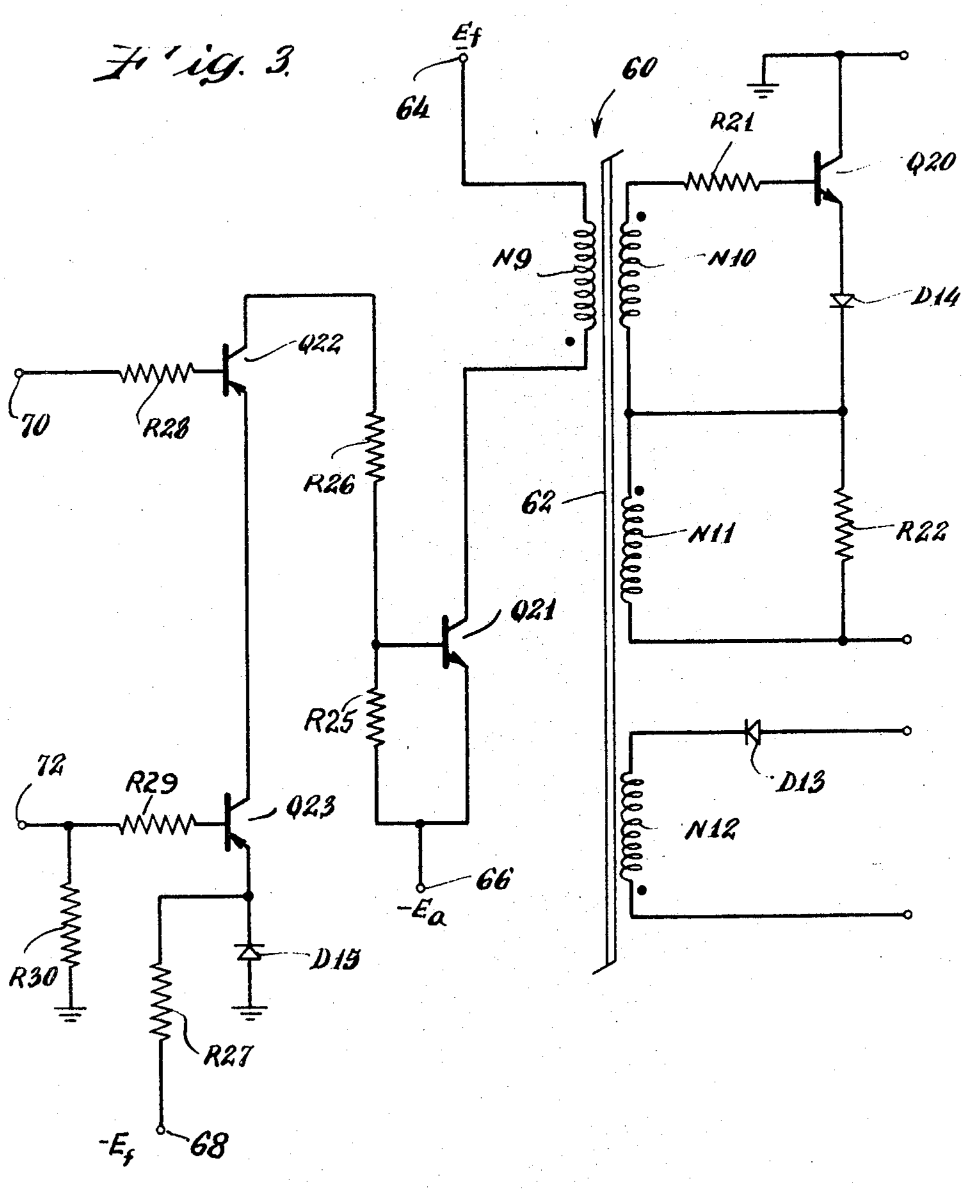
FIGURE 3 is a circuit diagram of an incremental magnetic counter stage and a portion of the preferred electronic switching means of the present invention.

An alternative form of the invention is shown in FIGURE 3. A variable incremental magnetic counter generally indicated at 60, is constructed in the manner of the variable counter 40 of FIGURE 2 to include an input winding N9, a triggering winding N10, a resetting winding N11, and an output winding N12 all linking a saturable magnetic core 62. A resetting transistor Q20 responds, when core 62 returns to its residual level after being switched to its opposite condition of magnetic saturation, to pass current through the resetting winding N11, returning the core to its original condition of magnetic saturation.

Departing from the circuit arrangement of FIGURE 2, one side of the input winding N9 is connected to the fixed supply voltage $-E_f$ at terminal 64. The other side of the input winding N9 is connectable through the collector-emitter circuit of an interstage transistor Q21 to the adjustable supply voltage $-E_a$ at terminal 66. Thus, the input winding N9 is connectable through transistor Q21 to receive the potential difference between $-E_a$ and $E_f$, where $-E_a$ is always the more negative potential.

The base of transistor 21 is connected to the adjustable voltage $-E_a$ at terminal 66 through a resistor R25. The base of transistor Q21 is additionally connected through a resistor R26, the collector-emitter circuit of a gating transistor Q22, the collector-emitter circuit of a second gating transistor Q23, and a resistor R27 to the fixed power supply voltage $-E_f$ at terminal 68.

Output pulses developed by the output winding N4 of the pulse former 10 of FIGURE 1 (or any fixed count counter connected to supply voltage $E_f$) are applied to input terminal 70 and communicated to the base of gating transistor Q22 through a resistor R28. The polarity of the output pulses is such that gating transistor Q22 is turned on for the duration of each pulse.

The base of gating transistor Q23 is connected through a resistor R29 to an input terminal 72. A resistor R30 connects the input terminal 72 to ground. This input terminal receives a control input signal derived from an electronic switch such as the electronic latch 50 of FIGURE 2. Since the gating transistor Q23 is shown to be a PNP type, a negative control signal voltage must be applied to input signal 72 to render this transistor conductive. When the electronic switch 50 of FIGURE 2 is in its "on" condition, a suitable negative control signal voltage may be taken from the collector of transistor Q13 to turn the gating transistor Q23 on. A diode D15 connected from the emitter of gating transistor Q23 to ground insures that this transistor is biased off during the absence of an enabling negative control input signal voltage at input terminal 72.

It will be seen from FIGURE 3, that the output pulses from the pulse former or previous fixed count counter are not injected into the input winding N9 of the counter 60. Thus, the voltage of these output pulses is not used to incrementally saturate the core 62. Instead, these output pulses are utilized as gating pulses to turn on gating transistor Q22 for their pulse duration. This duration is proportional to supply voltage $E_f$.

Assuming that the gating transistor Q23 is enabled by a control input signal applied to input terminal 72, interstage transistor Q21 will be biased on for the time duration of each output pulse applied to input terminal 70. Consequently, during the duration of each output pulse, the input winding N9 is connected between power supply terminals 64 and 66. Current proportional to the difference between the adjustably preset potential level of the adjustable voltage $E_a$ and the fixed potential level of supply voltage $E_f$ thus flows through the input winding N9 to incrementally magnetize the core 62 of variable counter 60 during the duration of each output pulse.

It will be seen that if either gating transistor Q22 or Q23 are nonconducting, the base biasing circuit consisting of resistors R25, R26 and R27 is interrupted and transistor Q21 is biased off. Transistor Q21 is thus rendered conductive to draw current through input winding N9 of the variable counter 60 only when there are pulse outputs from a preceding count stage, and the electronic switch has been selectively conditioned to operatively connect counter 60 to this preceding count stage.

It will be seen that since the potential levels of the adjustable voltage $E_a$ and the fixed voltage $E_f$ track each other, voltage fluctuations which would alter the time duration of output pulses from preceding stages are compensated for by the proportionate fluctuations in the potential level of the adjustable voltage $E_a$. Since in this embodiment of the invention, only the time content (pulse duration) of the input pulses is used, the output winding supplying the input pulses need not be critically tested. The input pulse duration is equal to the reset time of the saturable core magnetically coupled to the output winding. Thus, the input pulse duration is a function of the fixed supply voltage, the reset winding and its included reset circuit and the characteristics of the core.

As is understood, the preset level of the adjustable voltage $E_a$ determines the count modulus of variable counter 60. As in the electronic switching circuit of FIGURE 2, the switching transistors Q22 and Q23 need not have power handling capacities to control the condition of transistor Q21. This provides for more convenient and efficient controlled electronic switching.

Without intending to limit the invention, an operative circuit based on the disclosed embodiment of FIGURE 3 has the following circuit values:

transistors:
- Q21—T1413 (Texas Instruments, Inc.)
- Q22 and Q23—2N1303 or 2N3638 resistors:
- R25—1 kilohm
- R26—820 ohms
- R27—100 kilohms
- R28—10 ohms
- R29—8.2 kilohms
- R30—33 kilohms supply voltage $E_f$—8 volts
supply voltage $E_a$—8.7 to −15 volts.

It will be understood that although the electronic latch 50 (FIGURE 2) is preferred, conventional electronic switches and flip-flops may be used instead. Similarly, the power supply 16 (FIGURE 1) is preferred but should not be considered critical to the present invention. It will be appreciated that where NPN type transistors are specifically disclosed, PNP types could just as well be employed, and vice versa.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

Having described our invention, what we claim as new and desire to secure by Letters Patent is:

1. A variable magnetic count stage operating to count uniform input pulses developed by a pulse source, said count stage comprising, in combination:
- (A) a power supply providing
  - (1) a fixed voltage applied to said pulse source
    - (a) the voltage and time parameters of said input pulses being a function of said fixed voltage, and
  - (2) a selectably adjustable voltage,
  - (3) said power supply maintaining the ratio of said fixed and adjustable voltages constant;
- (B) a saturable magnetic core;
- (C) an input winding linking said core
  - (1) said input winding being connectable to receive said adjustable voltage from said power supply,
- (D) first electronic valve means operating in response to each said input pulse to pass current in proportion to the potential of said adjustable voltage through said input winding
  - (1) to drive said saturable core from one condition of magnetic saturation to its opposite condition of magnetic saturation in a number of increments determined by the potential of said adjustable voltage,
  - (2) said first electronic valve means having a control terminal; and
- (E) second electronic valve means selectively operated to apply a bias signal to the control terminal of said first electronic valve means
  - (1) whereby to selectively enable said first electronic valve means to respond to said input pulses.

2. A variable magnetic count stage operating to count input pulses developed by a pulse source, said count stage comprising, in combination:
- (A) a power supply providing,
  - (1) a fixed voltage applied to said pulse source,
    - (a) the parameters of said input pulses being a function of said fixed voltage,
  - (2) a selectably adjustable voltage,
  - (3) said power supply maintaining the ratio of said fixed and adjustable voltages constant;
- (B) a saturable magnetic core;
- (C) an input winding linking said core,
  - (1) said input winding being connectable to receive said adjustable voltage from said power supply;
- (D) a first transistor selectively operated in response to each input pulse to pass current in proportion to the potential level of said adjustable voltage through said input winding, said first transistor having,
(1) a collector-emitter circuit connecting in series circuit said input winding and said adjustable voltage, and
(2) a base; and
(E) a second transistor selectively operated to apply base bias to the base of said first transistor,
(1) whereby to enable said first transistor to respond to said input pulses.

3. A variable magnetic count stage operating to count constant volt-second input pulses developed by a pulse source, said count stage comprising, in combination:
(A) a power supply providing,
(1) a fixed voltage applied to said pulse source,
(a) the voltage and time parameters of said input pulses being a function of said fixed voltage,
(2) a selectably adjustable voltage,
(3) said power supply maintaining the ratio of said fixed and adjustable voltages constant;
(B) a saturable magnetic core;
(C) an input winding linking said core,
(1) said input winding being connected to said adjustable voltage;
(D) an interstage transistor having,
(1) an emitter-collector circuit selectively conductive to pass said input pulses to said input winding,
(a) the volt-second content of said input pulses being altered in proportion to the potential level of said adjustable voltage, and
(2) a base;
(E) a second transistor having,
(1) a collector-emitter circuit selectively rendered conductive to connect the base of said interstage transistor to said fixed voltage, and
(2) a base;
(F) electronic switching means selectively operated to apply a control signal to the base of said second transistor,
(1) whereby to render the collector-emitter circuit of said second transistor conductive to apply base bias enabling said interstage transistor to pass input pulses to said input winding.

4. A variable magnetic count stage operating to count constant volt-second input pulses developed by a pulse source, said count stage comprising, in combination:
(A) first and second input terminals to which said pulses are applied;
(B) means supplying a selectably adjustable voltage;
(C) a saturable magnetic core;
(D) an input winding linking said core,
(1) said input winding being connected to said adjustable voltage;
(E) an interstage transistor having,
(1) an emitter-collector circuit connecting said first input terminal to said input winding,
(a) to selectively pass said input pulses to said input winding,
(b) the volt-second content of said input pulses being altered in proportion to the potential level of said adjustable voltage, and
(2) a base;
(F) a second transistor having,
(1) a collector-emitter circuit selectively rendered conductive to connect the base of said interstage transistor to said second input terminal, and
(2) a base;
(G) electronic switching means selectively operated to apply a control signal to the base of said second transistor,
(1) whereby to render the collector-emitter circuit of said second transistor conductive to permit the application of said input pulses across the emitter and base of said interstage transistor, and
(2) whereupon to bias said interstage transistor on to pass said input pulses to said input winding.

5. The device defined in claim 4 further comprising:
(H) a diode,
(1) connected across the collector-emitter circuit of said second transistor,
(2) such that pulses of opposite polarity to said input pulses bias said interstage transistor off.

6. A variable magnetic count stage operating to count input pulses developed by a pulse source, said count stage comprising, in combination:
(A) a saturable magnetic core;
(B) an input winding linking said core;
(C) means supplying a selectably adjustable voltage;
(D) first electronic valve means responsive to said input pulses;
(E) second electronic valve means selectively enabled when said count stage is to count said input pulses; and
(F) third electronic valve means connected to said first and second electronic valve means operating when said second electronic valve means is enabled and when said first electronic valve means is enabled for the duration of each input pulse to connect said adjustable voltage to said input winding.

7. A variable magnetic count stage operating to count uniform volt-second input pulses developed by a pulse source, said count stage comprising, in combination:
(A) a power supply providing,
(1) a fixed voltage supplied to said pulse source,
(a) the voltage and time parameters of said input pulses being a function of said fixed voltage, and
(2) a selectably adjustable voltage,
(3) said power supply maintaining the ratio of said fixed and adjustable voltages constant;
(B) a saturable magnetic core;
(C) an input winding linking said core;
(D) a first transistor having,
(1) an emitter-collector circuit connecting said adjustable voltage to said input winding, and
(2) a base;
(E) a second transistor having,
(1) an emitter-collector circuit, and
(2) a base to which said input pulses are applied.
(a) said emitter-collector circuit rendered conductive for the duration of each input pulse;
(F) a third transistor having,
(1) an emitter-collector circuit, and
(2) a base circuit to which a control signal is applied when said count stage is to count input pulses,
(a) said control signal being effective to render said emitter-collector circuit conductive;
(G) said emitter-collector circuit of said third transistor and the emitter-collector circuit of said second transistor providing a series circuit to the base of said first transistor effective to bias said first transistor on to connect said adjustable voltage through its emitter-collector circuit to said input winding.

8. A counter stage comprising, in combination:
(A) an input circuit for receiving pulses, the modulus of the counter stage being a function of the volt-second content of input pulses supplied to said input circuit;
(B) a selectively variable potential source connected in series with said input circuit;
(C) electronic valve means comprising,
(1) a pair of controlled terminals in series with said input circuit and said potential source, and
(2) a control terminal;
(D) means controlling the potential at said controlled terminal thereby controlling the supply of input pulses to said input circuit and;
(E) a fixed potential source supplying a potential to a prior counter stage controlling said last named means,
(1) said fixed potential being connected in series with said input circuit and said variable potential source, and
(2) said fixed potential being proportional to said selected variable potential.

9. The counter stage defined in claim 8 wherein said last named means is responsive to the output time of the prior counter stage connected to said input circuit.

References Cited

UNITED STATES PATENTS

| | | | |
|---|---|---|---|
| 2,824,698 | 2/1958 | Van Nice et al. | |
| 3,240,950 | 3/1966 | Calabro et al. | 307—88 |
| 3,312,830 | 4/1967 | Gore et al. | 307—88 |

STANLEY M. URYNOWICZ, Jr., Primary Examiner

U.S. Cl. X.R.

340—174